US011623367B2

(12) United States Patent
Thepsimuang

(10) Patent No.: US 11,623,367 B2
(45) Date of Patent: Apr. 11, 2023

(54) METHODS AND SYSTEMS FOR CRYSTALLIZING TACKY MATERIALS USING A TUMBLER

(71) Applicant: Gala Industries, Inc., Eagle Rock, VA (US)

(72) Inventor: Boonlert Thepsimuang, Troutville, VA (US)

(73) Assignee: Maag Gala, Inc., Eagle Rock, VA (US)

( * ) Notice: Subject to any disclaimer, the term of this patent is extended or adjusted under 35 U.S.C. 154(b) by 302 days.

(21) Appl. No.: 16/824,316

(22) Filed: Mar. 19, 2020

(65) Prior Publication Data
US 2020/0298449 A1    Sep. 24, 2020

Related U.S. Application Data

(60) Provisional application No. 62/822,701, filed on Mar. 22, 2019.

(51) Int. Cl.
*B29B 9/16* (2006.01)
*B01F 29/00* (2022.01)
(Continued)

(52) U.S. Cl.
CPC ............... *B29B 9/16* (2013.01); *B01F 29/40* (2022.01); *B01F 35/2115* (2022.01);
(Continued)

(58) Field of Classification Search
CPC ..... B29B 2009/165; B29B 9/16; B29B 9/065; C08G 63/88; C08G 69/46
See application file for complete search history.

(56) References Cited

U.S. PATENT DOCUMENTS 1,723,367 A    11/1927   Paris
2,680,084 A     7/1948   Ryan
(Continued)

FOREIGN PATENT DOCUMENTS

CN      200949997 Y    9/2007
JP      2000297987 A   10/2000
WO      2016103003 A1   6/2016

OTHER PUBLICATIONS

International Search Report & Written Opinion dated Jun. 10, 2020, from corresponding application No. PCT/US2020/023621.
(Continued)

*Primary Examiner* — Mary Lynn F Theisen
(74) *Attorney, Agent, or Firm* — Troutman Pepper Hamilton Sanders LLP; John Morrissett; Scott A. Bergeson

(57) ABSTRACT

A tumbler crystallizer for crystallizing pelleted, tacky, polymeric materials includes a housing for rotatably supporting a removable paneled drum on rollers. The removable panels may be made of a transparent, heat-insulating material. The drum receives a flow of hot pellets through an inlet chute, and a tumbling action of the drum and internal agitators keeps the pellets in motion relative to each other to prevent agglomeration until they reach a desired level of crystallinity and are no longer tacky. Baffle plates are provided at intervals along the length of the drum to slow the flow of pellets therethrough to increase residence time. Damper plates are provided near the exit end of the drum to aid in building a bed of pellets within the drum, and also to control residence time of the pellets within the drum.

20 Claims, 10 Drawing Sheets

(51) Int. Cl.
  *B01F 35/93* (2022.01)
  *B01F 35/21* (2022.01)
  *B01F 35/221* (2022.01)
  *C08G 69/46* (2006.01)
  *C08G 63/88* (2006.01)

(52) U.S. Cl.
  CPC .......... *B01F 35/2216* (2022.01); *B01F 35/93* (2022.01); *B01F 29/401* (2022.01); *B29B 2009/165* (2013.01); *C08G 63/88* (2013.01); *C08G 69/46* (2013.01)

(56) References Cited

U.S. PATENT DOCUMENTS

| | | |
|---|---|---|
| 3,720,286 A | 3/1973 | Clark |
| 3,756,996 A | 9/1973 | Pugh et al. |
| 3,763,704 A | 10/1973 | Blau et al. |
| 3,960,501 A | 6/1976 | Butuzov et al. |
| 4,296,072 A | 10/1981 | Takacs et al. |
| 4,483,886 A | 11/1984 | Kowalski |
| 5,406,844 A | 4/1995 | May, III et al. |
| 5,633,018 A | 5/1997 | Stouffer et al. |
| 6,139,627 A | 10/2000 | Duval et al. |
| 6,344,539 B1 | 2/2002 | Palmer |
| 6,644,845 B1 | 11/2003 | Zikeli et al. |
| 8,044,169 B2 * | 10/2011 | DeBruin .................. F26B 5/08 528/274 |
| 2002/0030308 A1 | 3/2002 | Yerushalmi |
| 2007/0219341 A1 * | 9/2007 | Hally .................... B01J 19/006 528/272 |
| 2007/0276120 A1 * | 11/2007 | DeBruin .................. B29B 9/06 528/308.1 |
| 2008/0289208 A1 | 11/2008 | Bryan |
| 2012/0035342 A1 * | 2/2012 | Culbert .................. C08G 63/80 422/134 |
| 2012/0280419 A1 | 11/2012 | Martin et al. |
| 2018/0028948 A1 | 2/2018 | Thrasher et al. |

OTHER PUBLICATIONS

Extended European Search Report dated Nov. 18, 2022 issued in European Patent Application No. 20780020.2.

* cited by examiner

METHODS AND SYSTEMS FOR CRYSTALLIZING TACKY MATERIALS USING A TUMBLER

CROSS-REFERENCE TO RELATED APPLICATION

This application claims priority to and the benefit of U.S. Provisional Patent Application No. 62/822,701, filed Mar. 22, 2019.

FIELD OF INVENTION

The presently disclosed subject matter relates generally to systems and methods for using a tumbler to aid in crystallizing materials, particularly systems and methods for using a tumbler as a crystallizer for certain crystallizable polymers.

BACKGROUND

Certain polymers, after undergoing melt extrusion and pelletization, will begin to crystallize in pellet form due to certain conditions imposed on the resulting pellets. Conditions such as heating the pellets, cooling the pellets, mechanical deformation, or solvent evaporation from the polymer can cause crystallization to occur. Crystallization affects optical, mechanical, thermal and chemical properties of the polymer, and is often a desired effect to have in the polymer pellets.

In an underfluid pelletizing system, as the cut pellets produced from the extruded polymer melt cool within the cutting chamber fluid, the temperature of the pellets falls until it drops below the melting temperature Tm, at which time the pellet is frozen in its physical form. At this point, crystal growth may be achieved by the further addition of folded polymer chain segments and only occurs for temperatures below the melting temperature Tm and above the glass transition temperature Tg. Higher temperatures destroy the molecular arrangement and below the glass transition temperature, the movement of molecular chains is frozen. Therefore, it is important to keep the pellets at a temperature that allows crystallization to continue for an extended time, until the desired degree of crystallinity is achieved. For some materials, this can be on the order of seconds, and for others, this can take minutes, hours, or even longer. Also, for some materials, the pellets remain tacky and stick to each other until the desired degree of crystallization is achieved, at which time they may become less tacky and free flowing.

Several methods and devices have been proposed for aiding in the crystallization of crystallizable polymer pellets. For example, after the cutting and drying of the pellets they may be stored in silos where they may be brought to within the crystallization temperature range by forcing heated gas, such as air, nitrogen, or an inert gas, through the pellets for an extended time, until the desired degree of crystallinity has been achieved. For materials that may be tacky until crystallized, some means for agitation is needed within the heated silos to keep the pellets from sticking to each other until they lose their tackiness due to crystallization. This is an energy intensive, and therefore costly, process.

Another method that aids in crystallization of pelleted material is the Gala Industries CPT® process, as exemplified by U.S. Pat. Nos. 8,361,364 and 9,032,641, both herein fully incorporated by reference, which, in some embodiments, uses compressed gas injected into the slurry line between the cutting chamber of the pelletizer and the centrifugal dryer to speed the pellets to the dryer, thus reducing their residence time within the cooling fluid. The pellets thereby retain a large portion of their internal heat, maintaining their temperature in the crystallization range between Tg and Tm. The pellets may then be conveyed from the dryer to an insulated container via a vibrating conveyor, where the retained internal heat continues to crystallize the pellets. If the pellets are of a nature where they are tacky until crystallized, some form of agitation must be supplied until the pellets attain the crystallinity degree that reduces their tackiness. For certain materials that are extremely tacky when pelletized until the desired level of crystallinity is achieved that reduces the tackiness, it has been found that vibratory conveyors do not provide adequate agitation to prevent the agglomeration of the pellets.

Another method, marketed by Nordson/BKG and described in U.S. Pat. No. 8,324,339, is the CrystallCut® process, which is used especially for PET material. In the CrystallCut® system, the hot PET pellets produced by the underwater pelletizer are transported rapidly to the pellet dryer in hot water (up to 95° C.) through closed conveying pipes, where pellet cooling and solidifying takes place. This conveying medium and the short distance between die head and dryer are keys to conserving the heat from melt processing. The pellets are at a temperature in the 150 to 160° C. range when they exit the dryer onto a vibrating conveyor. This keeps the pellets in constant motion, generates a uniform distribution of thermal energy, and prevents pellets from sticking together as crystallization takes place. As with the Gala CPT® process, while this method may be effective for PET, materials that are highly tacky until crystallized tend to agglomerate even with the limited agitation that can be provided by the vibrating conveyor.

A further method of attempting to prevent tacky materials from agglomerating until they are crystallized is using a Torusdisc Paddle Dryer, manufactured by Bepex, to add heat to and agitate the pellets after they exit the dryer. As with the heated silo method, adding heat to the pellets is costly from an energy cost standpoint. Further, the Torusdisc does not do a good job of preventing agglomeration of highly tacky materials, and the churning of the pellets by the rotating discs may cause fracture of the pellets and may generate an unacceptable amount of material fines.

Another method of preventing agglomeration of material during crystallization is the Novatec™ CCR system, which uses agitating paddles within a silo type vessel to stir the material within the vessel. With this system, not all pellets are being moved by the agitators continuously, so agglomeration can occur between times that the paddles pass though the pellets. To fix this problem, the agitator paddles can be rotated at higher speeds, but this tends to fracture the pellets, and still is not effective in continuously agitating the pellets.

Accordingly, there is a need for improved systems and methods to address the above-mentioned deficiencies. Embodiments of the present disclosure are directed to these and other considerations.

SUMMARY

Briefly described, embodiments of the presently disclosed subject matter relate to systems and methods for using a tumbler device to provide the necessary agitation to prevent highly tacky, pelletized material from agglomeration until the desired degree of crystallinity can be achieved. Examples of such materials are certain grades of PLA (PolyLactic Acid), certain polyesters, certain TPUs, among others.

A tumbler device, similar to that manufactured by Gala Industries and described in U.S. Pat. No. 9,782,705, which is herein fully incorporated by reference, may be modified and used to provide a tumbling action to the crystallizable pellets as they exit the pellet dryer. The tumbling action of the tumbler device provides an agitation that is different from that of a vibrating conveyor and has unexpectedly been found to prevent agglomeration of the tacky pellets as they crystallize and lose their tack. This tumbling action provides more movement, in the form of a continuous, rolling motion, to the pellets as compared to vibrating devices. Further, the tumbling action of the tumbler device provides a gentle rolling of the pellets, thereby avoiding pellet fracture and fines generation that plague other agitation devices.

Specifically, in some embodiments, the tumbler device described in U.S. Pat. No. 9,782,705 may be modified to become a crystallizing tumbler by removing the screened sections from the rotating drum and replacing them with transparent polycarbonate window panels. The polycarbonate window panels allow viewing of the material within the tumbler to assure that the material is not agglomerating as it crystallizes. Another advantage of the polycarbonate panels is that they are a very good insulator against heat loss, as it is important to maintain the temperature of the crystallizing pellets above Tg, and preferably close to Tm. In other embodiments, the screens may be replaced by other transparent polymeric materials, or even transparent ceramics or glass. In still further embodiments, if viewing the material within the drum is not necessary, opaque materials may replace the screens, such as solid steel or other solid material panels, with or without insulated surfaces. In this regard, the solid opaque panels may be provided with smaller viewing ports comprised of the aforementioned transparent material. Additionally, thermocouples have been added to the inlet end and the outlet end, arranged so that the thermocouple tips extend into the tumbling bed of pellets, to monitor the temperature of the incoming and exiting pellets, and a further thermocouple has been added to monitor air temperature within the drum. Further modifications have been made to the outlet end of the drum so that the pellets will be retained within the drum for a time sufficient to allow the desired degree of crystallinity to be obtained before the pellets exit the drum. Other means have been added to prevent premature flow of the pellets from the inlet to the outlet, so as to maintain a desired residence time of the pellets within the tumbler.

Therefore, it is an object of the present disclosure to provide a tumbler device that may act as a crystallizer for materials that remain tacky until a desired level of crystallization is achieved.

It is a further object of the present disclosure to provide a tumbler device that provides a level of agitation greater than that of vibrating bed devices and that prevents agglomeration of tacky materials as they crystallize.

It is yet another object of the present disclosure to provide a tumbler device that provides a relatively slow, smooth, rolling agitation to crystallizing materials, that does not cause fracture of the crystallizing materials, does not generate excessive fines in the agitation of the materials, and does not present excessive heat loss from the pellet mass to the surrounding air as opposed to torus disc agitators.

It is still a further object of the present disclosure to provide a tumbler device for crystallization of materials by utilizing retained internal heat of the material to aid in the crystalizing of the material. To this end, the tumbler utilizes an insulated drum that retains the material's heat as it passes through the tumbler, and means are provided within the drum to retain the pellets therein for a desired residence time.

Another object of the invention is to provide means for preventing pellets entering the tumbler device through the inlet from advancing along the length of the tumbler prematurely thereby maintaining a uniform crystallization of the bed of pellets as they advance the length of the tumbler towards the outlet. To this end, a pellet deflector plate may be placed just past the inlet that stops the pellets from splashing about the drum and advancing prematurely along the length of the drum.

Yet another object of the present disclosure is to provide a tumbler device with an added air tube for providing an optional heated air or other gas to the interior of the tumbler drum, to aid in preheating the interior of the drum, or alternatively to add heat to the material to aid in crystallizing, when necessary.

BRIEF DESCRIPTION OF THE DRAWINGS

The above and other objects, features, and advantages of the present disclosure will become apparent from the following description of preferred embodiments given in conjunction with the accompanying drawings, in which.

DETAILED DESCRIPTION

Figure 1:
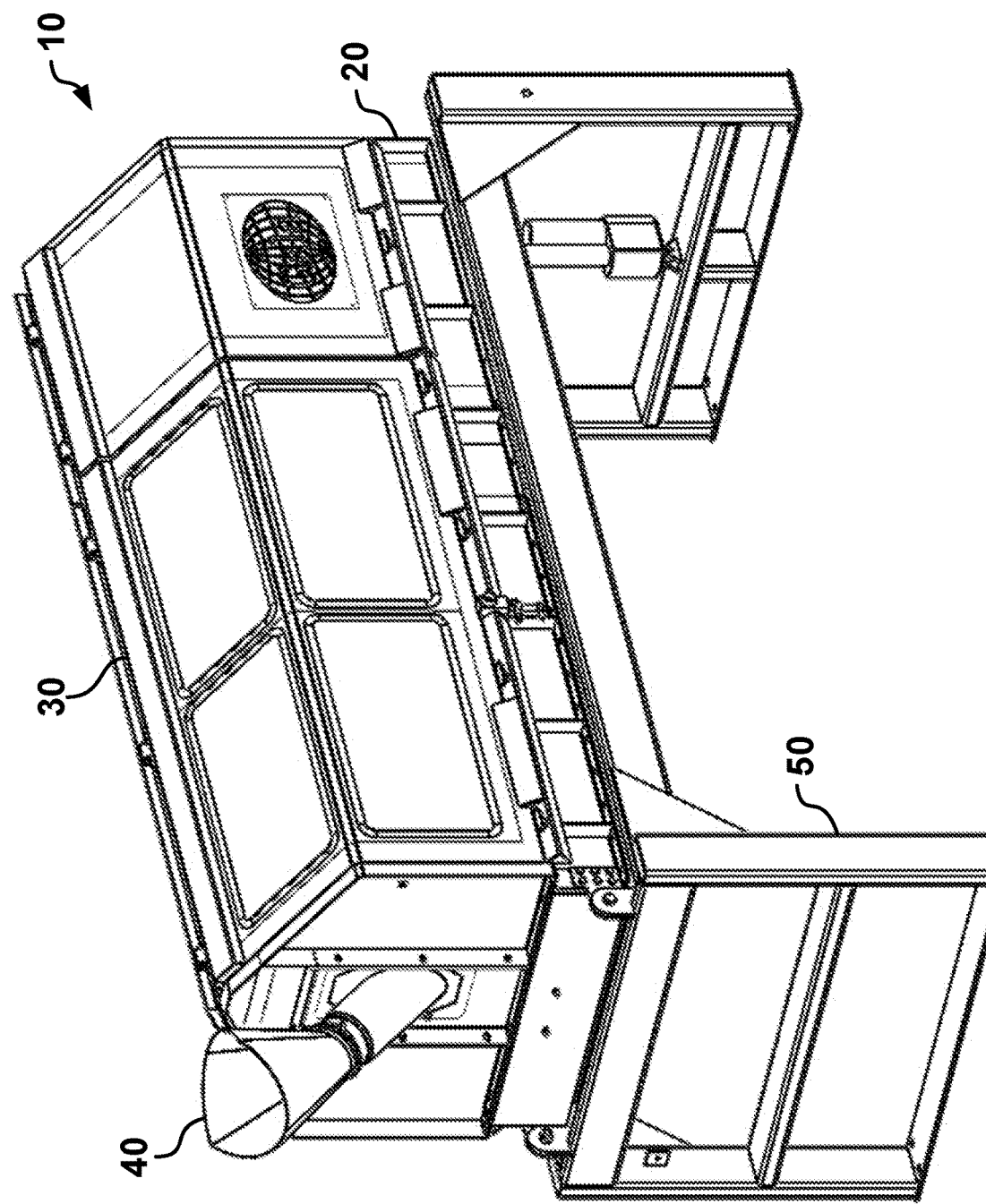
FIG. 1 is an isometric front view of a crystallizer tumbler having closed doors in accordance with some embodiments of the present disclosure.

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

The terms "crystallizer", "crystallization", "crystalline", "crystallized" and "crystallizable" used herein are all used in connection with a process associated with partial alignment of a polymer's molecular chains. The degree of crystallinity, as estimated by different analytical methods, typically ranges from below 10% to above 80%, thus crystallized polymers are often called "semi-crystalline". Throughout the following description, any reference to the above "crystalline" terms refers to "semi-crystalline" material, which may be of any degree of crystallinity.

The term "pellet" used herein, for example, can include, and be interchangeable with, micropellets or particulates. Such pellets/micropellets/particulates can take on a variety of shapes and are typified by regular or irregular shaped discrete particles without limitation to their dimensions, including flakes, stars, spheres, cylindrical pellets, lenticular or disc-shaped pellets, chopped fibers, rubber crumb pellets, and/or other shapes. They can also be round, square, rectangular, triangular, pentagonal, hexagonal or otherwise geometric in cross-section, star-shaped or other decorative designs, and can be the same or different when viewed in a second cross-section perpendicularly to the first. It shall also be understood that the pellets do not have to be solid pieces but may include particles defining openings or hollow shapes. Additionally, the pellets may include expanding agents, foaming agents, or volatiles, which may be partially or wholly expanded to produce low (or lower) bulk density particles.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required. The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of being a crystallizer tumbler.

FIG. 1 shows one embodiment of a crystallizer tumbler as used in the present disclosure. The main features of the crystallizer tumbler device may be similar to those of the tumbler dryer device manufactured by Gala Industries and shown and described in U.S. Pat. No. 9,782,705, which is hereby fully incorporated by reference. Crystallizer tumbler 10 may have a housing 20, one or more doors 30, a pellet inlet chute 40, and a frame 50. As shown, the doors 30 are closed to contain a flow of crystallizable material, typically in the form of polymer pellets, within the tumbler 10 and to prevent unwanted objects from entering the tumbler 10. The doors also aid in preventing loss of heat from the material within the drum inside the tumbler. In contrast, the doors 30 are opened in FIG. 2 and removed in FIGS. 3 and 4, revealing other components of the tumbler 10 including a rotatable drum 60, blower section 70, a tilt mechanism 80, a pellet outlet chute 90, and a stop ring 100.

Figure 3:
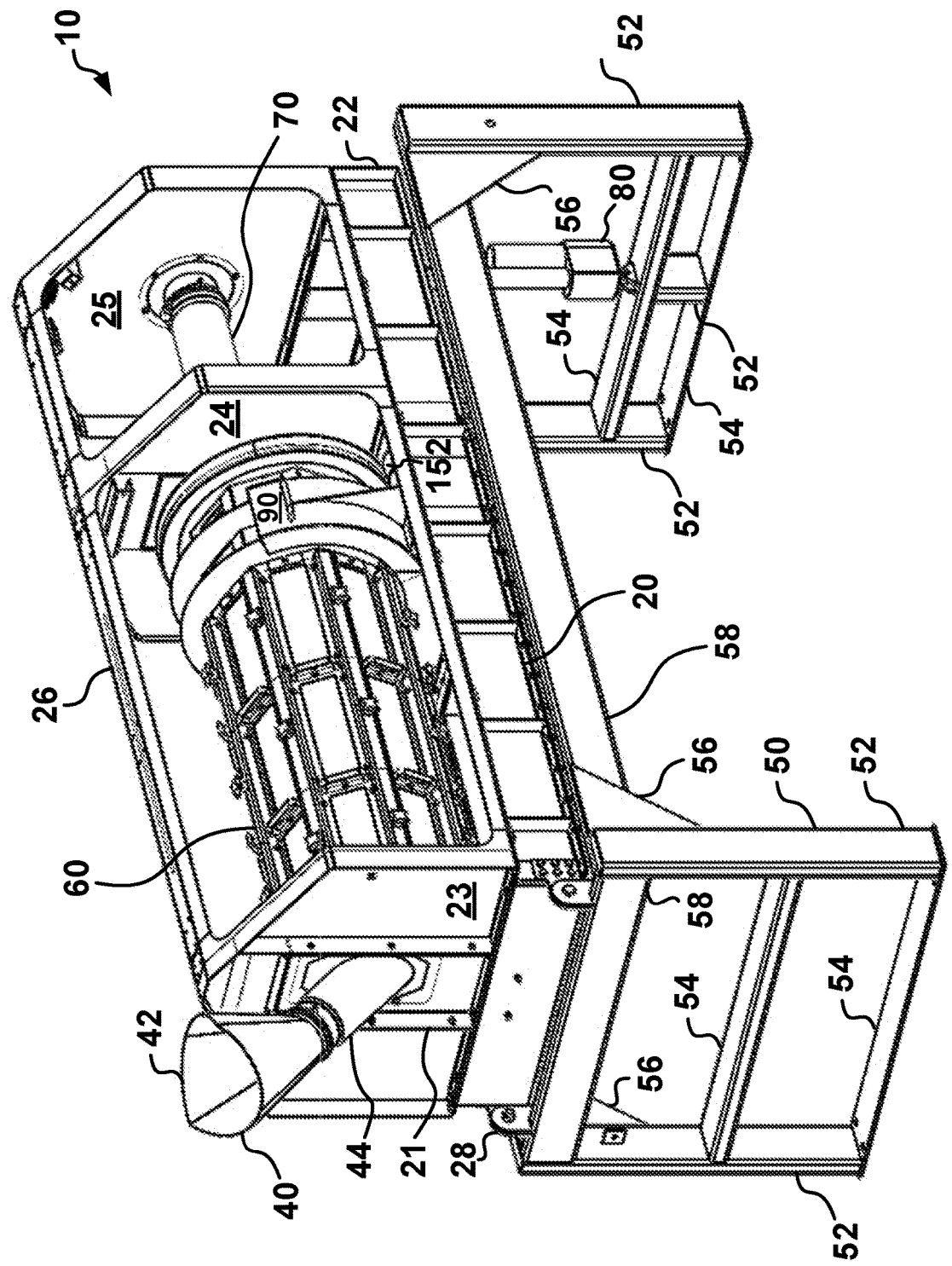
FIG. 3 provides a cutaway isometric front view of a crystallizer tumbler having its doors removed and a rotatable drum in accordance with some embodiments of the present disclosure.
Figure 4:
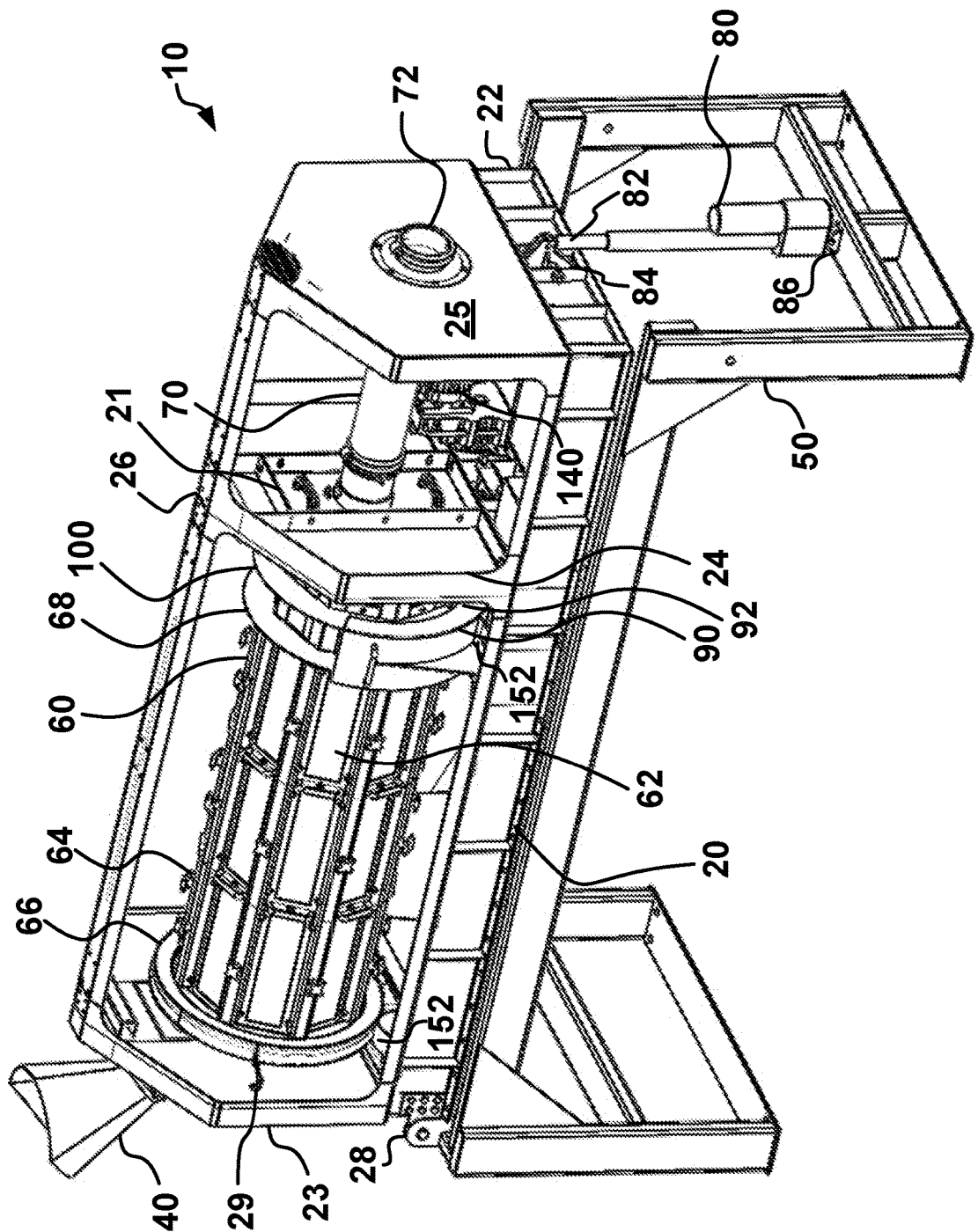
FIG. 4 shows a cutaway isometric rear view of a tumbler having its doors removed and a rotatable drum in accordance with some embodiments of the present disclosure.

Shown in more detail in FIGS. 3 and 4, the housing 20 may be configured to support the doors 30 and the drum 60 of the tumbler 10. In one embodiment, the housing 20 may include a base 22, an inlet faceplate 23, an outlet faceplate 24, a back faceplate 25, an upper member 26, one or more connectors 28, and a static dissipation brush 29. Specifically, the base 22 may serve as a horizontal platform that supports the rest of the housing 20 above the frame 50, while faceplates 23, 24, and 25 extend vertically from the base 22 and are connected to the upper member 26, which extends horizontally along the top surface of the faceplates 23, 24, 25.

The base 22 may be constructed from a metal, wood, or hard plastic, and be configured to withstand the force of the drum's 60 rotation and weight and support the remainder of the housing 20 and the doors 30. For example, in some embodiments, the base 22 may be a stainless steel, such as 304 stainless steel, which allows for easy welding. In other embodiments, the base 22 may be a carbon steel. In further embodiments, the base 22 may be an aluminum, advantageously reducing its weight. The base 22 may vary in shape. For example, in some embodiments, the base 22 may be rectangular and include four I-beams or other beams, which may be attached to one another by means known in the art (e.g., welding, bolts, clamps, etc.). The base 22 may take on dimensions as needed to fit other components of the crystallizer tumbler 10, particularly the drum 60.

Extending vertically from the base 22, the faceplates 23, 24, 25 may contain the inner components (e.g., the drum 60, the blower section 70, etc.) of the crystallizer tumbler 10. The inlet faceplate 23 may extend vertically from the inlet end of the base 22 (i.e., the end of the tumbler 10 having the pellet inlet chute 40), and be configured to support the pellet inlet chute 40 as it extends through the inlet faceplate 23 to attach to the drum 60. The inlet faceplate 23 may be further configured with a floating seal 21 to prevent the pellets from exiting the drum back through the inlet faceplate 23. Details of the inlet construction, in accordance with some embodiments, may be found in the aforementioned U.S. Pat. No. 9,782,705.

Figure 6:
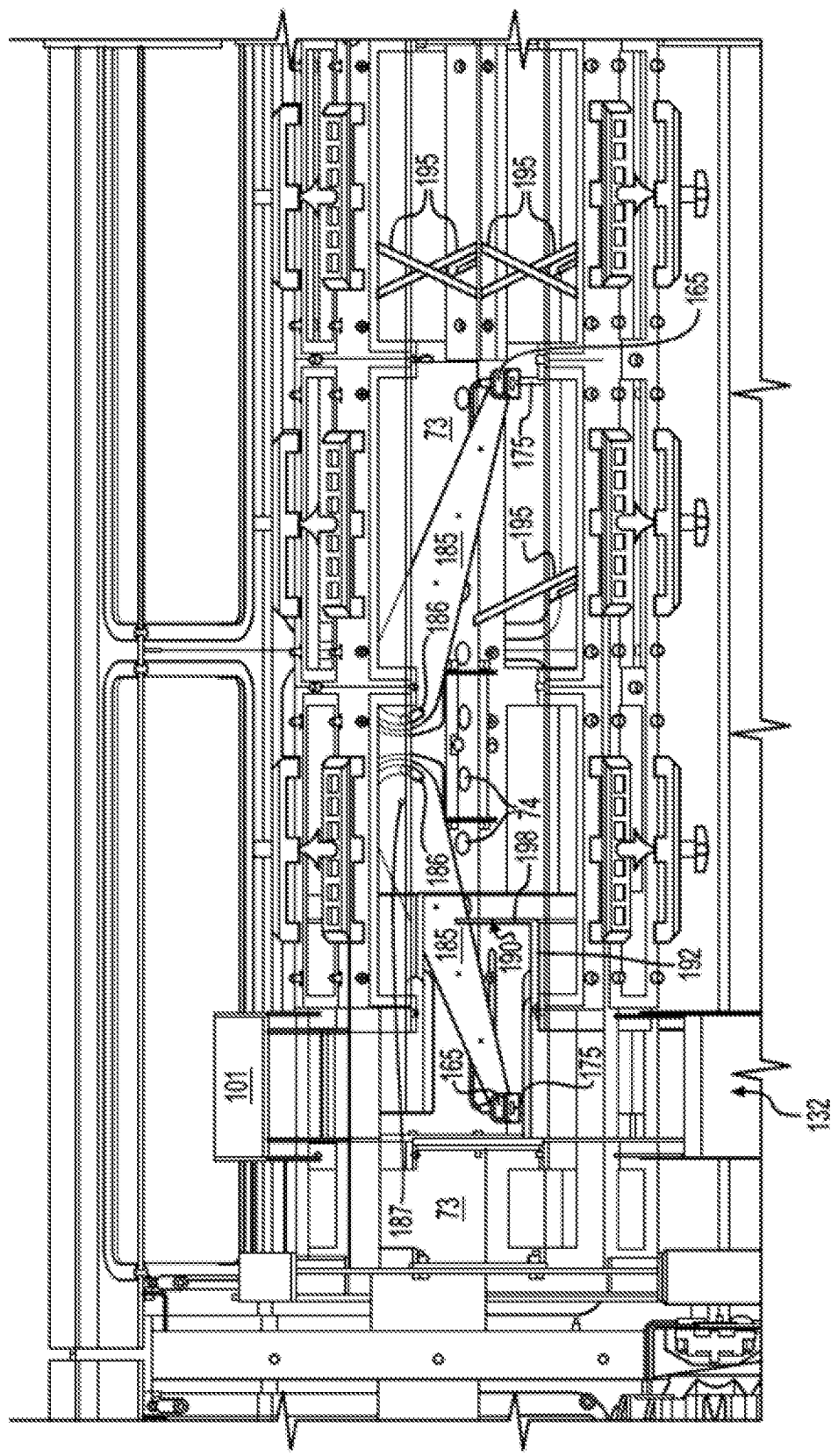
FIG. 6 is a partial cutaway view inside the crystallizer drum of FIG. 5 showing mounting of the thermocouples in accordance with some embodiments of the present disclosure.

The outlet faceplate 24 may extend vertically from the base 22 at the outlet end of the drum 60 (i.e., opposite the pellet inlet chute 40) and be configured to support the blower section 70 as it extends through the outlet faceplate 24 and inside of the drum 60. The outlet faceplate 24 may also be configured to prevent the flow of pellets beyond the outlet faceplate 24. In some embodiments, the outlet faceplate 24 may include a floating seal 21, or a similar device to prevent pellets from escaping the drum 60 through a gap between the outlet faceplate 24 and the air tube 73 (FIG. 6). The floating seal may be configured to allow the air tube 73 to be removed or adjusted to a desired angle while keeping pellets from undesirably exiting the drum 60. For example, in some embodiments, the outlet floating seal may be configured similarly or identically to the floating seal 21 used at the inlet end of the tumbler 10. Again, as mentioned above in connection with the inlet construction, details of the outlet construction, in accordance with some embodiments, may be found in the aforementioned U.S. Pat. No. 9,782,705.

The faceplates 23, 24, 25 may be constructed from a metal, wood, or hard plastic, and be configured to withstand the force of the drum's 60 rotation and weight and support the doors 30. For example, in some embodiments, the faceplates 23, 24, 25 may be constructed from stainless steel, carbon steel, or aluminum. In some embodiments, the faceplates 23, 24, 25 may have similar dimensions. For example, in one embodiment, the faceplates 23, 24, 25 may each be pentagonal having square bottom portion and a triangular top portion. In other embodiments, the faceplates 23, 24, 25 may be sized and shaped to contain the drum 60 and other inner components within the tumbler 10. The upper member 26 may be constructed from a metal, wood, or hard plastic, and be configured to horizontally support the top of the faceplates 23, 24, 25. For example, the upper member 26 may be constructed from stainless steel, carbon steel, or aluminum. In some embodiments, the upper member 26 may form an isosceles trapezoid that has a wider bottom face than the top face, as shown in FIG. 3. In other embodiments, the upper member 26 may take on other shapes, such as a rectangle, cylinder, or other shape configured to connect to the faceplates 23, 24, 25 and allow movement of the doors 30. It is contemplated that the upper member 26 may include one or more handles or attachment points for transportation of the crystallizer tumbler 10. Additionally, in some embodiments, multiple upper members 26 may be used based on the desired shape of the crystallizer tumbler 10.

In one embodiment, the connectors 28 may be positioned on opposing sides of the inlet end of the tumbler 10. In other embodiments, however, the connectors 28 may be positioned on the outlet end of the tumbler 10 if the tilt mechanism 80 is switched to the inlet end of the tumbler 10. In some embodiments, the connectors 28 may form a pivot connection between the housing 20 and the frame 50, as shown in FIG. 4. For example, the connectors 28 may include two or more members having a hole connected via a bolt or shaft. In this embodiment, one or more spacers may be used to separate the members of the connector 28 to help facilitate pivoting of the connector 28. The connectors 28 may rotate relative to their pivot points as the tilt mechanism 80 adjusts. That is, as the tilt mechanism 80 adjusts, the angle of the housing, and in turn the drum 60, may increase or decrease relative to a horizontal plane as the connectors 28 remain at a fixed height. In this manner, the tilt mechanism 80 may adjust the residence time of pellets within the drum 60. In some embodiments, the connectors 28 may be constructed from a metal, wood, or hard plastic. Further, as the connectors 28 may be moving parts of the tumbler 10, they may be oiled and/or greased in some embodiments to help facilitate movement.

In other embodiments, the tumbler 10 may not include a frame 50. Instead, the base 22 may be suspended from an above point via cables, ropes, beams, etc. For example, in one embodiment, the inlet and outlet ends of the tumbler 10 may be suspended above the ground surface via a cable. It is contemplated that the tumbler 10 may be configured such that its height off of the ground surface is adjustable, either via the cables or an adjustable height feature of the frame 50.

In some embodiments, the static dissipation brush 29 may be housed on the back side of the inlet faceplate 23 facing the drum 60, as shown in FIG. 4. The static dissipation brush 29 may slowly draw an electric charge from the drum 60, which could prevent an operator from being undesirably shocked. To help the static dissipation brush 29 slowly conduct the electric charge and prevent shock, it may be placed in a position to contact or almost contact the drum 60. In one embodiment, the static dissipation brush 29 may extend from the inlet faceplate 23 such that it may conduct an electric charge from the drum 60 without impeding rotational movement of the drum 60. In some embodiments, the static dissipation brush 29 may be constructed from any static dissipative material, which may have a resistivity value between about $10^5$ to about $10^{12}$ ohm-meters. In other embodiments, the tumbler 10 may have a grounding feature, which may be advantageous in hazard areas. For example, in one embodiment, a wire or brush may extend from the ceiling at an angle such that the wire or brush remains in contact with the drum 60 as it rotates. For example, the wire or brush may be angled to contact the side of the drum 60 that rotates downwardly. As such, the wire or brush may be upkeep sufficient contact for grounding purposes without impeding rotation of the drum 60. In other embodiments, other methods of grounding or static dissipation known in the art may be used.

Figure 2:
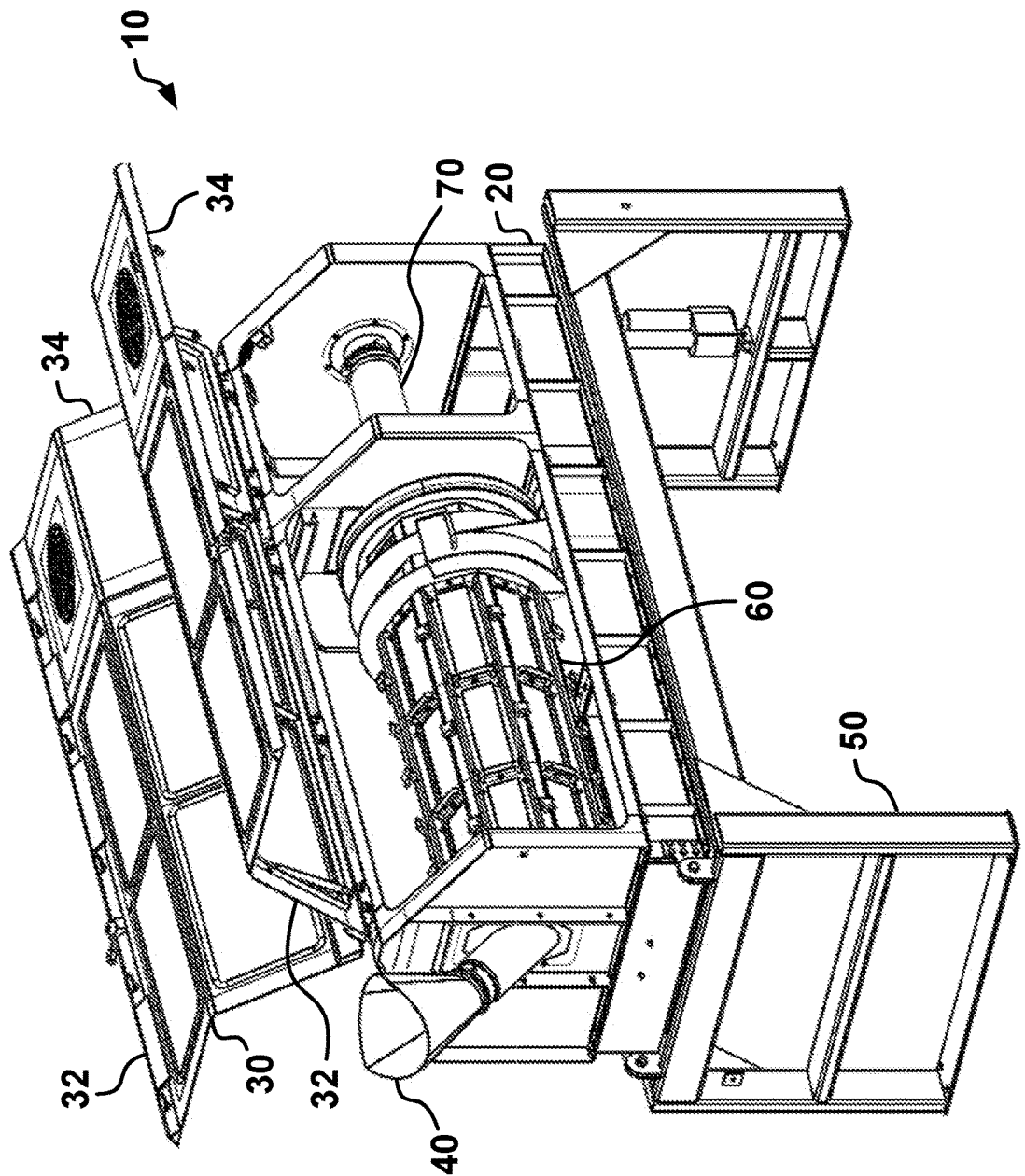
FIG. 2 shows an isometric front view of a crystallizer tumbler having open doors and a rotatable drum in accordance with some embodiments of the present disclosure.

As shown in FIG. 2, the doors 30 may include one or more drum doors 32 and one or more service doors 34 each extending from the upper member 26 of the housing 20. In one embodiment, the doors 30 may open and close together. In another embodiment, the drum door 32 and the service door 34 may be configured to open and close independently. The doors 30 may bend as they extend downwardly such that they cover a portion of the top and side of the tumbler 10. Alternatively, in other embodiments, the doors 30 may only cover the top or a side of the tumbler 10.

Once the doors 30 are closed and the crystallizer tumbler 10 is ready for operation, the pellet inlet chute 40 may be configured to receive and direct a flow of pellets into the drum 60 of the crystallizer tumbler 10. In some embodiments, as shown in FIGS. 1 and 2 and in more detail in FIG. 3, the pellet inlet chute 40 may include a funnel 42 connected to a conduit 44. The funnel 42 may be configured to receive the pellets from an upstream component (e.g., a pelletizer, a dryer, a defluidizer, or another tumbler) and direct the pellets into the conduit 44.

In some embodiments, the funnel 42 may be conically shaped and constructed from a metal, wood, or hard plastic. For example, in one embodiment, the funnel 42 may be rolled sheet metal. The funnel 42 may have a lower opening with a diameter about the same as that of the conduit 44, and a larger, upper opening for collecting the pellets. In other embodiments, the pellet inlet chute 40 may not include a funnel 42 as the conduit 44 may be directly attached to an outlet of an upstream component.

Figure 9:
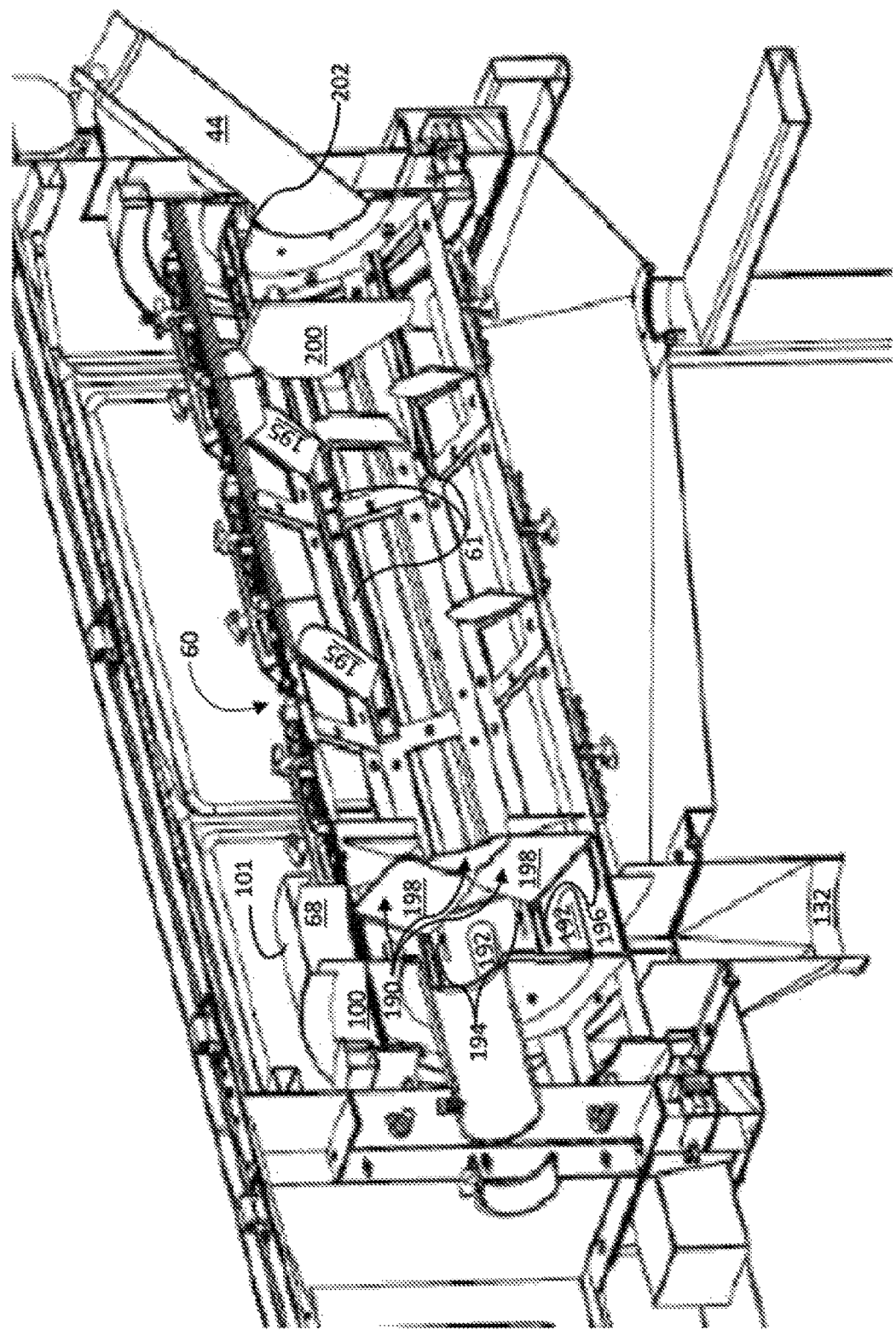
FIG. 9 is an isometric longitudinal cross-section vertically through the length of the drum showing details of the pellet bed damper plates, baffle plates, and the inlet deflector plate in accordance with some embodiments of the present disclosure.

The conduit 44 may be a hollow cylindrical, rectangular, or other cross-sectional shaped conduit configured to transport the pellets into the drum 60, as shown in FIG. 3 and in FIG. 9. In some embodiments, the conduit 44 may be sized to fit through the inlet faceplate 23 with minimal clearance room. It is contemplated that the conduit 44 may have the same diameter throughout its length. For example, in one embodiment, the conduit 44 may pass through an expandable member in the inlet faceplate 23 that snugly fits around the conduit 44 to prevent the pellets and heat from escaping the tumbler through the inlet faceplate 23 and foreign objects from entering the tumbler 10. It is contemplated that the floating seal or similar device may be used to hold the conduit 44 in place and allow the pellets to enter the drum 60 while preventing the pellets from leaking out of the conduit 44 before entering the drum 60. The vertical cross-section of the conduit 44 may be elliptical or rectangular as it enters the floating seal. Additionally, seals (e.g., polyamide or fluoropolymer seals) may be used to seal the connection between the conduit 44 and the inlet faceplate 23. In other embodiments, the dimensions of the conduit 44 may change as it extends based on the desired flow of the pellets into the drum 60. The conduit 44 may house a powder feeder (not shown) or otherwise introduce powder or other material for coating the pellets such as to aid in reducing their agglomeration in some embodiments.

Figure 10:
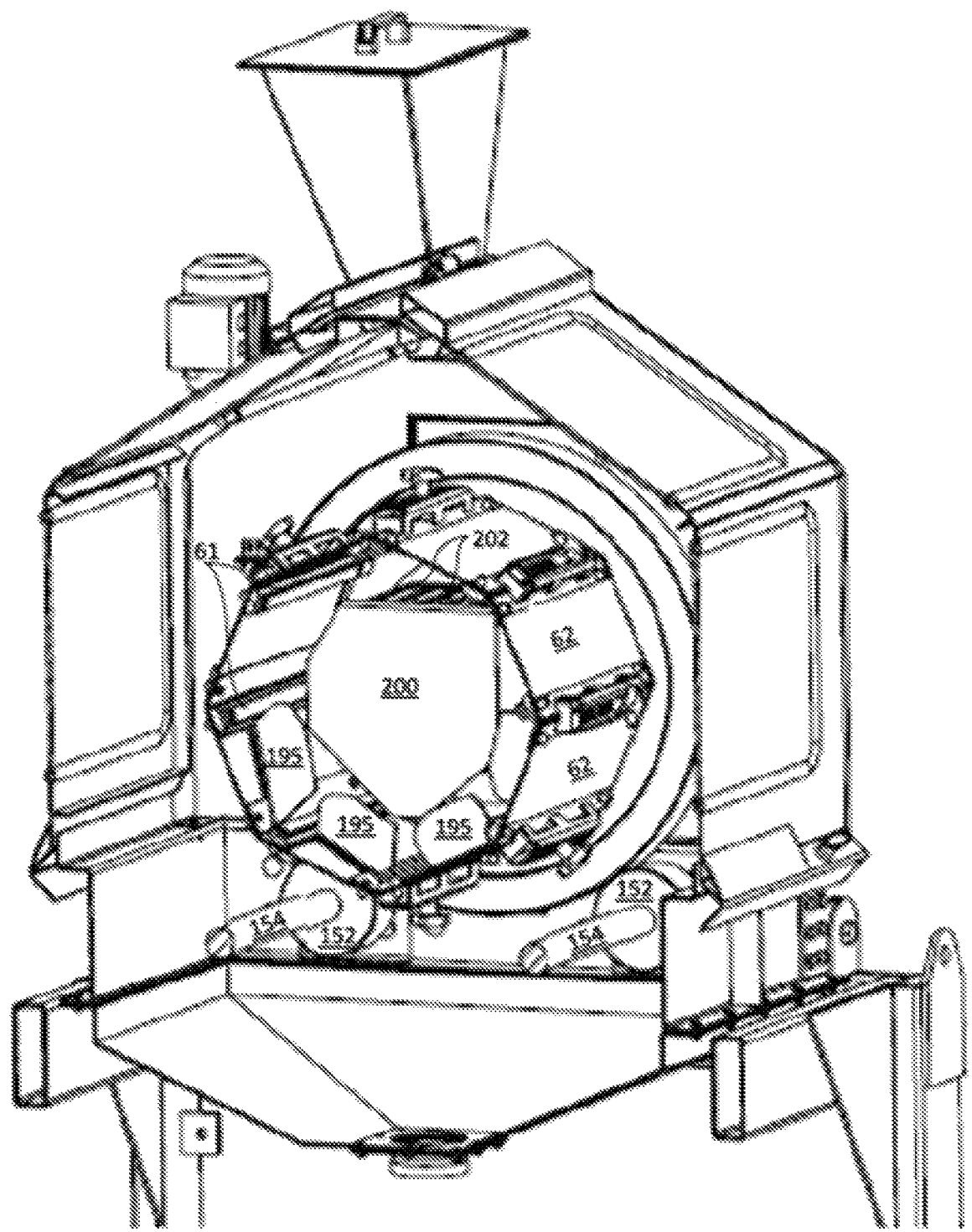
FIG. 10 is an isometric cross-section view looking towards the inlet end of the crystallizing tumbler.

As the material to be crystallized, e.g. pellets, leaves conduit 44 and enters into drum 60, the material tends to bounce off the interior surfaces of the drum and may bounce downstream in the drum prematurely, resulting in an uneven crystallization of the pellet bed. To aid in prevention of this premature downstream flow, deflector plate 200, shown in FIGS. 9 and 10, may be provided at the material inlet end just past the exit of conduit 44. Deflector plate 200 extends into the flow area in close proximity to the rotating drum, preventing the bouncing and splashing of the material downstream. Deflector plate 200 may be attached to the inlet end of the housing and may be cantilevered therefrom and may extend vertically into the flow. To aid in preventing a build-up of material atop the cantilevered region as the material is tumbled by the drum, deflector plate slots 202 may be provided therein allowing the tumbled material to flow therethrough and back to the drum to be tumbled. As can be seen in FIG. 10, the deflector plate 200 may have an asymmetrical shape which fits more tightly to the drum, blocking flow, on the side of the drum away from the pellet flow, and which is more open on the side of the drum in the flow direction, allowing more open flow of the pellets.

Supporting the housing 20 off of the ground surface, the frame 50 is shown in FIGS. 1, 2, and 4, and in more detail in FIG. 3. In some embodiments, the frame 50 may include one or more vertical members 52, one or more cross members 54, one or more corner support members 56, and one or more horizontal members 58. The frame 50 may be constructed from a metal, wood, or hard plastic, and be configured to, collectively, withstand the force of the drum's 60 rotation and weight and support the remainder of the tumbler 10. In one embodiment, the frame 50 may be constructed from aluminum to limit its weight. As previously noted, in other embodiments, the tumbler 10 may replace the frame 50 with a suspension device configured to suspend the drum 60 above the ground surface. In some embodiments, the vertical members 52 may extend proximate a vertical axis along the four corners of the tumbler 10. In other embodiments, one or more vertical members 52 may be spaced along the length of the tumbler 10 as needed to support the tumbler 10 or as desired. For example, in one embodiment, three vertical members 52 may extend downwardly from the housing 20 and support the tumbler 10 to prevent the tumbler 10 from wobbling on even ground or when the vertical members 52 are not exactly the same length. The vertical members 52 may be shaped as needed to structurally support the tumbler 10. In some embodiments, the vertical members 52 may be rectangular and straight such that they are configured to attach to other components of the frame 50 at right angles. In other embodiments, the vertical members 52 may be cylindrical and/or curved to provide clearance for other components or to decrease the ground space required for the tumbler 10. In further embodiments, the vertical members 52 may be hollow to decrease their weight. In other embodiments, the vertical members 52 may be solid or filled with a material to weight the frame 50 to prevent the tumbler 10 from moving despite its vibrations from the rotating drum 60.

The cross members 54 may, in some embodiments, extend proximate a horizontal axis and connect one or more of the vertical members 52 to one another. The cross members 54 may be shaped as needed to structurally support the tumbler 10. In some embodiments, the cross members 54 may be rectangular and straight such that they are configured to attach to other components of the frame 50 at right angles. In other embodiments, the cross members 54 may be cylindrical and/or curved to provide clearance for other components. In further embodiments, the cross members 54 may be hollow to decrease their weight. In other embodiments, the cross members 54 may be solid or filled with a material to weight the frame 50 to prevent the tumbler 10 from moving despite its vibrations from the rotating drum 60.

In some embodiments, the corner support members 56 may connect the corners formed by at least some of the vertical members 52 and the horizontal members 58. The corner support members 56 may be triangular and configured to structurally support the frame 50 by keeping the vertical members 52 upright. It is also contemplated that the corner support members 56 may support other joints in the frame 50, including joints between the vertical members 52 and the cross members 54.

In other embodiments, the horizontal members 58 may extend proximate a horizontal axis and connect the top of the vertical members 52 to one another. The horizontal members 58 may be configured to receive the housing 20 such that the housing 20 fits snugly on top of the horizontal members 58. In some embodiments, the horizontal members may be configured to pivotally attach to the housing 20 via the connectors 28. In some embodiments, the horizontal member 58 may be a solid single surface that covers the bottom of the housing 20. The surface of the horizontal members 58 may include a rough surface to grip the housing 20 and prevent the housing 20 from sliding as the drum 60 rotates. In other embodiments, the horizontal members 58 may surround the perimeter of the housing 20. The horizontal members 58 may be hollow in some embodiments to reduce their weight, and solid in other embodiments for strength.

Figure 5:
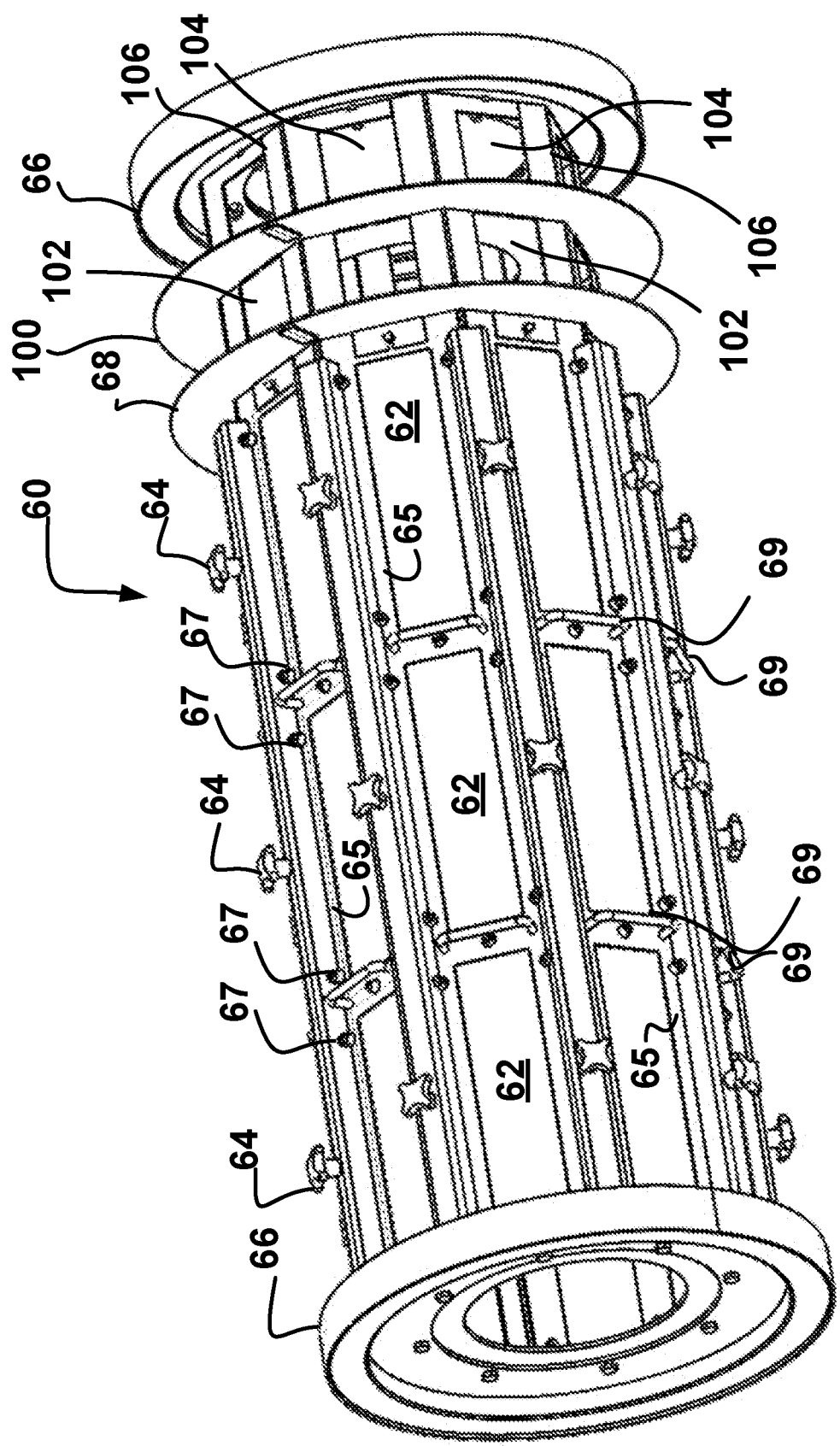
FIG. 5 shows an isometric front view of a drum in accordance with some embodiments of the present disclosure.

Shown in greater detail in FIGS. 4 and 5, the drum 60 may be configured to receive the pellets, wherein they remain for a desired residence time while crystallization takes place before they are directed to the pellet outlet chute 90. In some embodiments, the drum 60 may include a plurality of removable panels 62 each connected to the drum 60 via a plurality of knobs 64 and connectors 67. Panels 62 may be made of a transparent material such as glass, polycarbonate, acrylic, or other suitable transparent material. The transparency of panels 62 aids in viewing the contents inside drum 60 as the contents tumble therein. It is important to be able to visually monitor the tumbling materials, especially at the input end, to be able to ensure that breaking up of any agglomeration is taking place, and if it is not, to take corrective action. Glass, polycarbonate and acrylic are also good insulators, helping prevent loss of heat from the pellets as the drum rotates. Other materials may be used for panels 62, whether transparent, translucent or opaque, but should have good insulating properties for preventing heat loss from within the drum. If opaque materials are used, they may be provided with viewing ports therein (not shown) to still allow a visual indication of the state of pellet flow within the drum. If viewing the interior of the drum is deemed unnecessary, solid, opaque panels may be used instead. It is further contemplated that the whole interior or exterior of steel drum 60 may be lined with an insulating coating or insulating surfaces to further reduce heat loss from the interior of the drum. In between each panel 62, the drum 60 may include a hand bar 69 to assist an operator in manually rotating or carrying the drum 60. The drum 60 may also include two or more drum wheels 66 configured to roll to rotate the drum 60. The drum 60 may further include one or more rings 68 to, along with the stop ring 100, prevent pellets from escaping the pellet exit chute 90 as they exit the drum 60 through one or more openings 102 (e.g., sections without a panel 62). Optionally, in some embodiments, the drum may include one or more openings 104 downstream of the stop ring 100, the openings 104 being defined by a plurality of frame members 106. The frame members 106 may extend along the length of the drum 60 and be configured to attachably receive the panels 62.

The knobs 64 and connectors 67 may have mating elements (e.g., other connectors or holes) for attaching the panels 62 onto the frame members 106. To secure the alignment of the panels 62, the panel frame 65 may include holes configured to fit around the connectors 67. In some embodiments, the panels 62 may snap onto the connectors 67.

In other embodiments, the knobs 64 may be positioned to slidably receive one or more edges of the panel 62 (or several panels 62). After sliding the edge of the panel 62 under the knob 64, an opposing edge of the panel 62 may be fastened to the drum 60 via the connector(s) 67. In this embodiment, the required number of connectors 67 may be limited by the use of the knobs 64. Further, the knobs 64 and connectors 67 may be configured to screw in, clip, latch and/or snap on such that an operator can quickly connect or remove the panel 62 without the use of tools. In other embodiments, the panels 62 may be bolted, welded, hinged and latched, clamped, and/or sealed to the drum 60. Additionally, seals or gaskets may be used at the connection points to help contain pellets and micropellets within the drum 60.

Figure 7:
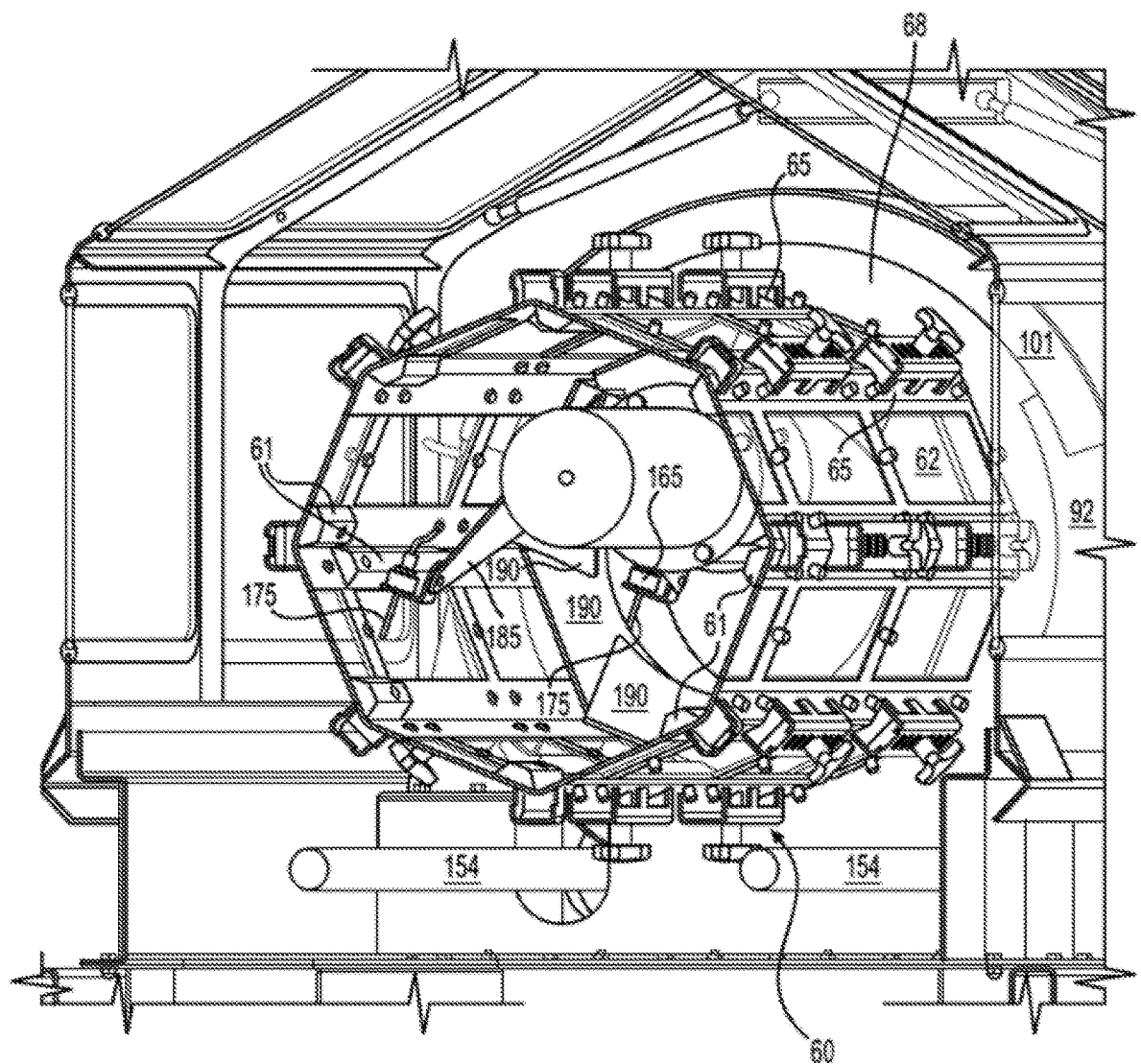
FIG. 7 is an isometric cross-section of the crystallizer drum of FIGS. 5-6 showing details of the discharge end in accordance with some embodiments of the present disclosure.
Figure 8:
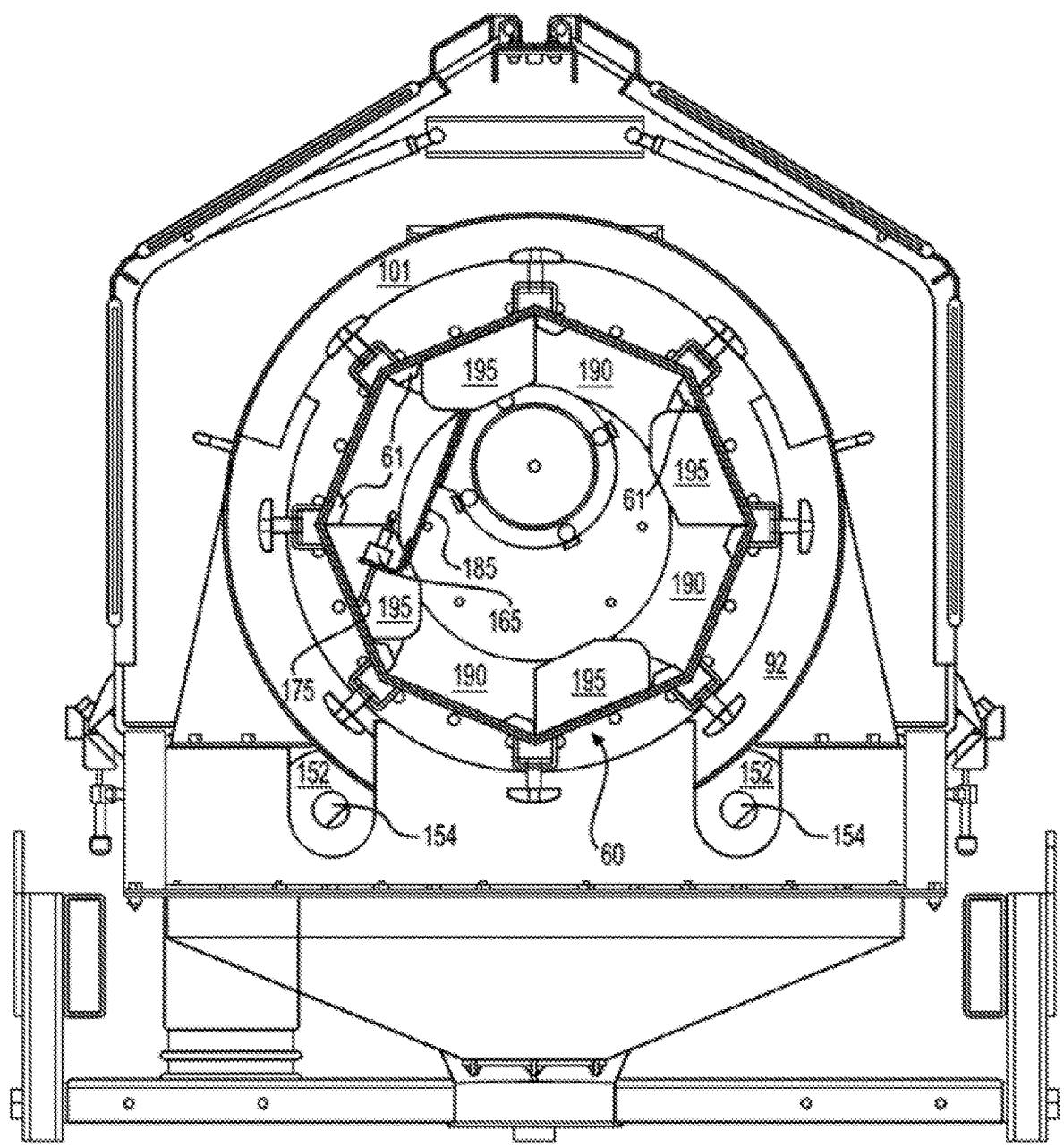
FIG. 8 is a cross-section end view showing the discharge end of the drum of FIGS. 5-7 in accordance with some embodiments of the present disclosure.

On the inside of the drum 60, as shown in FIGS. 7-9, one or more agitators 61 may connect to the panel frame 65 and extend toward the center of the drum 60. The agitators 61 may be shaped and positioned to help agitate the pellets within the drum 60 as it rotates. For example, in one embodiment, the agitators 61 may be trapezoidal shaped in cross-section. The base angles of the trapezoid can be chosen such that the agitation action of agitator 61 can be increased, with steeper base angles, or decreased, with shallower base angles. In another embodiment, agitators 61 may be L-shaped and form a right angle such that a portion of each agitator 61 is perpendicular to the other portion. Alternatively, in other embodiments, the agitators 61 may form an acute or an obtuse angle. The base angles of trapezoidal agitators, or angle of the L-shaped agitators 61 may affect the duration and extent at which the pellets are transported upwardly by the agitators 61 as the drum 60 rotates. Other geometries for the agitators 61 are also contemplated. For example, in some embodiments, the agitators 61 may be thick or thin flat bar, curved, or spiraled to achieve the desired effect.

In some embodiments, the agitators 61 and/or other components within the tumbler 10 may be treated with various coatings, as desired. For example, in one embodiment, the agitators 61 may be treated with a wear resistant coating to help improve their durability. In other embodiments, inlet chute 44 and other non-rotating parts, as well as any rotating parts of drum 60, may be coated with non-stick coatings to prevent the tacky, non-crystallized material from sticking thereto. It is contemplated that any coatings or surfaces treatments may be used, including those described in U.S. Pat. No. 8,080,196, which is incorporated by reference herein.

The hand bars 69 may be U-shaped and extend outwardly from the exterior of the drum 60, as shown in FIG. 5. In some embodiments, the hand bars 69 may be positioned and sized to assist in manually rotating or transporting the drum 60. In other embodiments, the hand bars 69 may snap, or otherwise connect, to the frame members 106 to help hold the panels 62 in place.

As shown in FIGS. 4 and 5, the drum wheels 66 may be round and configured to be mechanically driven to rotate the drum 60. By being round, the drum wheels 66 may allow for even, steady rotation of the drum 60 even though the drum may be non-circular (e.g., octagonal). The outer surface of the drum wheels 66 may be smooth to improve the steady rotation of the drum 60. In some embodiments, the diameter of the drum wheels 66 may be greater than that of the remainder of the drum 60. For example, in some embodiments, the drum wheels 66 may have a diameter of about 28 inches and the remainder of the drum 60 may have a diameter of about 20 inches. Other diameters for the drum 60 and/or drum wheels 66 may be used as desired. The drum wheels 66 may be constructed from a metal, wood, or hard plastic and configured to support the weight of the drum 60. In some embodiments, the drum wheels 66 may be the only attachment points between the drum 60 and the remainder of the tumbler 10. In such embodiments, the frame members 106 may be configured to maintain the structure of the drum 60 and its contents without bending as the drum 60 rotates. Further, as the drum 60 may be configured to rest on the drum wheels 66 without being fastened to the tumbler 10, it may be easily removable for transport, repair, or replacement.

Shown in detail in FIGS. 4 and 5, the ring 68 and the stop ring 100 may extend from the exterior of the drum 60 and may be configured to overlap with the pellet outlet chute 90 to prevent pellets from undesirably escaping the drum 60 before reaching the pellet outlet 132 (FIG. 6). In some embodiments, the ring 68 may only extend outwardly from the panels 62, while the stop ring 100 may extend inwardly and outward from the panels 62. In this configuration, the ring 68 may allow the pellets inside of the drum 60 to pass to the pellet outlet chute 90. As some pellets may attempt to bounce past the pellet outlet chute 90, the stop ring 100 may stop the pellets from continuing along the length of the drum 60 and, instead, fall into the pellet outlet chute 90. To further aid in preventing pellets from bouncing out of pellet outlet chute 90, an outlet chute cover 101 may be provided to cover the upper sections of ring 68 and stop ring 100 to prevent splashing of pellets out of the outlet region, as shown in FIGS. 7-9.

In some embodiments, the stop ring 100 may have a hole configured to allow the air tube 73 to pass through it, as shown in FIG. 6. It is contemplated that the hole may be configured to snugly fit the air tube 73 or that one or more seals may close any gap between the hole of the stop ring 100 and the air tube 73 to prevent pellets from passing through the stop ring 100. The ring 68 and the stop ring 100 may be constructed from a metal, wood, or hard plastic.

In between the ring 68 and the stop ring 100, the openings 102 may be configured to allow pellets to pass into the pellet outlet chute 90. In some embodiments, the openings 102, as defined by the space between the frame members 106, may be sized and shaped to allow all of the pellets to pass. In other embodiments, the openings 102 may be sized or shaped to limit the flow of the pellets to a rate or volume desired for a downstream process (e.g., bagging).

Downstream of the stop ring 100, the openings 104 may be defined by the space between the frame members 106. In some embodiments, the pellets are prevented from passing to this section of the drum 60, and accordingly, the panels 62 are not useful in this section.

In some embodiments, the frame members 106 may extend horizontally along the entire length of the drum 60 and connect the drum wheels 66 to one another. The frame members 106 may serve as a structural support for other components, such as the panels 62, the knobs 64, and the connectors 67, to connect to. In some embodiments, the frame members 106 may define the size and shape of the openings 102 and 104, as shown in FIG. 5. Depending on the number of frame members 106, the drum 60 may vary in shape. In some embodiments, the drum 60 may be octagonal and include eight frame members 106. This octagonal shape may be advantageous over a round shape as it defines smaller panels 62 than would be used for a single round drum 60. The smaller panels 62, which may be rectangular and extend the entire length of the drum 60 or only a portion of the length of the drum 60, may be easier and less expensive to install, remove, and repair. As the total number of frame members 106 increases, the shape of the drum 60 may become more rounded, allowing for smoother pellet flow within the drum 60. Conversely, the more non-round shape the drum 60 is, the more it may help to prevent agglomeration of the pellets as they are jostled around within the drum 60.

Partially disposed within the drum 60, as shown in FIG. 4 and in more detail in FIGS. 6-8, the air tube 73 may include an intake section 72 and a blower section 70. An air intake 72 may draw in ambient air, or may draw from a source of other gas such as Nitrogen or inert gas, outside of the back faceplate 25. The blower section 70 may direct the air or gas received from the intake section 72 to the drum 60 via one or more apertures 74. The air tube 73 may be removable in some embodiments, making it easy to transport or disassemble for replacement or repair. In other embodiments, the air tube 73 may be configured to rotate or have an adjustable angle at which it extends within the drum 60, allowing for delivery of air within the drum 60 as desired. In one embodiment, the air tube 73 may be about six inches in diameter. It is contemplated that the air tube 73 may take on any diameter or length as desired. Further, in some embodiments, the air tube 73 may vary in diameter or shape. In some embodiments, the intake section 72 may include the portion of the blower section 70 that extends outside of the drum 60. In some embodiments, the intake section 72 may draw in heated air or other gas from an attached heater (e.g., an electric, steam, or oil heater), not shown, to further aid in the crystallization of the pellets inside drum 60. Heated air or other gas may also be used to preheat the interior of drum 60, to aid in the heated pellets' retention of their internal heat. Alternatively, in other embodiments, a heater may be disposed within the blower section 70 and configured to heat air or other gas as is passes into the drum 60. By directing heated air or gas into the drum 60, the air tube 73 may accelerate crystallization of the pellets. It is most preferred that the crystallization takes place within the drum due only to the retained internal heat of the pellets, and the insulated nature of drum 60 maintaining this heat within the drum. However, under certain, and hopefully rare, conditions, air tube 73 will be in place to conduct a heated flow of air to the interior of the drum if needed. To this end, incoming pellet thermocouple 175 will measure the temperature of incoming pellets, and if this temperature is below a predetermined threshold for initiating crystallization, a blower may be activated to provide a flow of heated air to the interior of drum 60, in order to raise the temperature of the pellets to that needed for crystallization. Outlet thermocouple 175 may measure the temperature of outgoing pellets to determine if the desired temperature has been achieved, and if not, the flow rate and/or temperature of the airflow may be changed to achieve a pellet temperature necessary for crystallization. Further details of the air tube/blower section construction, in accordance with some embodiments, may be found in the aforementioned U.S. Pat. No. 9,782,705.

On the back end of the tumbler 10, the tilting mechanism 80 may be connected to the frame 50 and the housing 20 and configured to change the angle of the drum 60 relative to the horizontal to control the residence time of the pellets. In some embodiments, the tilting mechanism 80 may be a jack configured to lift or let down one end of the tumbler 10. As shown in FIG. 4, the tilting mechanism 80 may include an extendable member 82 and two attachment points 84 and 86. The tilting mechanism 80 may be manually adjustable and/or automatically adjustable via an electronic controller (not shown). Further, in some embodiments, an angle indicator (not shown) may be in communication with the tilting mechanism 80 and configured to determine and display the angle of the housing 20 and, in turn, the drum 60. While the tilting mechanism 80 may be configured to change the angle of the drum 60 as desired, the angle may be limited to a predetermined range in some embodiments (e.g., +/−5 degrees). It is also contemplated that the tumbler 10 may be tilted at varying degrees based on its intended use. For example, to increase residence time for slow to crystallize materials, the tumbler 10 may be tilted relative to a horizontal plane to a +/−5° angle. For quicker to crystallize material, the residence time may be shortened by tilting to a +/−2° angle. To clean the tumbler 10, it may be tilted downwardly to a −5° angle to aid the pellets to quickly exit the outlet end.

The motor 140, partially shown in FIG. 4, may be housed within the tumbler 10. In some embodiments, the motor 140 may be housed in between the outlet faceplate 24 and the rear faceplate 25. It is contemplated, however, that the motor 140 may be located on either side (e.g., inlet or outlet) of the tumbler 10. The motor 140 may be any device configured to generate mechanical power. For example, in some embodiments, the motor 140 may be an electric motor configured to convert electricity into mechanical motion. In other embodiments, the motor 140 may be an engine or a hydraulic motor. In one embodiment, the motor 140 may include a gear box.

Extending from the motor 140, a driveshaft (not shown) may include one or more rollers 152 connected via a shaft 154, as shown in FIGS. 7-8. These rollers 152 may collectively support and rotate the drum wheels 66, as shown in FIGS. 3 and 4. Optionally, in some embodiments, additional belts may be used such that the motor 140 drives multiple rollers 152. In some embodiments, the rollers 152 may be rolled sheet metal to limit their weight, though other materials may be used. The type of material used for rollers 152 may depend on the weight of the drum, the weight of the materials within the drum, the temperatures encountered, among others. The rollers 152 may be cylindrical and have smooth outer surfaces. The diameter of the rollers 152 may vary based on the desired rotational speed of the drum 60, the force output and desired efficiency of the motor 140, and the available space within the tumbler 10. The shaft 154 may be cylindrical and have a smaller diameter than the rollers 152 in some embodiments. In some embodiments, the shaft 154 may be a hollow shaft to decrease its weight.

Using the tumbler 10 as a crystallizer may be advantageous over using other crystallizers and crystallizing methods, which may be too rough and damage the pellets, such as a TorusDisc®, or ineffective at sufficiently preventing agglomeration of materials that are tacky while crystallizing, such as a Vibra type vibrating conveyor. This may be particularly important when the pellets are both a tacky and brittle material prior to their crystallization. In one embodiment, as an example, the crystallizer tumbler 10 may be configured to maintain a pellet residence time of 15 minutes with a continuous flow rate of 5,000 lbs. per hour, achieving a 40% or better crystallization, while minimizing pellet fracture and fines production, and preventing agglomeration of the material. Residence time and/or flow rate may be varied by adjusting the inclination angle of the drum 60, the diameter of the drum, or the drum length, drum rotation speed, and/or pellet outlet damper plate design, depending on need.

In order to build up a bed of pellets within drum 60, to aid in controlling the residence time of the pellets within the drum, and to aid in sealing in hot air within the drum, adjustable damper plates 190, FIGS. 7, 8 and 9, are positioned near the outlet of the drum to provide a dam over which the pellets must flow to reach pellet outlet 132 (FIG. 6). Damper plates 190, in conjunction with the tilt mechanism 80, may be used to control the flow rate of pellets through the drum 60 to outlet 132, thereby controlling residence time of the pellets within the drum 60. For an octagonal shaped drum, eight damper plates 190 are positioned about the interior circumference of the drum, one plate for each side of the drum. As shown in FIG. 9, the plates are formed in an L-shape, with a mounting leg 192 lying flat against the drum side and an upright leg 198 extending inwardly toward the drum center. Mounting legs 192 are attached to drum frame members 106 by way of fastener 194 through adjustment slot 196. Upright legs 198 of damper plates 190 fit tightly against one another and overlap the adjacent upright leg to prevent a flow of pellets therebetween, forcing the pellets to build up to a level where they overflow the tops of upright legs 198 before exiting the drum. To allow a shorter residence time, damper plates 190 may be adjusted open by sliding alternating plates forward along adjusting slot 196 to allow an opening between adjacent plates, or they may be fully opened to allow maximum opening between adjacent plates for quick emptying of the pellets from the drum.

In order to determine the necessary residence time to achieve the desired degree of crystallization, testing may be done with the desired material. To this end, freshly cut pellets with still intact internal heat may be collected and stored in an insulated container and the crystallinity may be determined at different time intervals until the time needed to achieve the desired crystallinity is determined. Alternatively, one may search for data sheets for the specific material which may give the crystallinity data as a function of time and temperature. Such information may be available and found on the internet for a variety of polymeric materials. Other sources of such information may be available, such as polymer textbooks or technical journals of polymer science. Once the required residence time is known, the tilt angle of the drum may be adjusted, either manually or automatically by a controller, so as to achieve the desired residence time of the pellets.

Other means may be provided to aid for increasing the residence time of the pellets as they flow from the inlet end of the drum towards the outlet end. To this end, as best shown in FIGS. 9 and 10, baffle plates 195 may be provided circumferentially around, and spaced along the length of drum 60. In an exemplary embodiment, drum 60 is divided into three sections, with eight baffle plates 195 provided between sections one and two, and four baffle plates 195 provided between sections two and three. The initial eight baffle plates 195 help maintain the incoming pellets within the first section of the drum until they build up to a level where they begin to flow past baffle plates 195 into the second section. As can be seen in FIG. 9, baffle plates 195 are placed at an angle to the flow direction, with the angle acting to push back and slow down the flow of pellets as the drum rotates. The angle provides a "snow plow" effect, helping to keep the pellets from flowing into the next drum section, with pellets only being allowed to pass through the spaces between adjacent plates. Due to baffle plates 195 and their angle to the pellet flow, the faster the drum rotates, the more the pellets are held back in the first drum section. Alternatively, if the drum is rotated in a reverse direction, the pellets may be advanced through the drum quickly, such as when the desire is to empty the drum. By the action of baffle plates 195 in retarding the flow of pellets along the length of drum 60, the internal heat of the pellets is maintained by the mass of pellets within the first section. Likewise, the four baffle plates 195 separating sections two and three tend to slow down the flow of pellets from the second section into the third section, where the pellets then ultimately build up until they flow over or past damper plates 190 and into pellet exit chute 90. More or less baffle plates may be used along the length of drum 60 as is needed to slow down or speed up the flow of pellets therethrough.

After the pellets reach the pellet outlet chute 90, they may be directed to the pellet outlet 132 and delivered to a downstream device (e.g., another tumbler used as a second crystallizer, a coater, a bagging assembly, a conveying system, a pellet classifier, etc.). To prevent the pellets from undesirably exiting the drum 60 before reaching the pellet outlet 132, the ridges 92, seen in FIG. 4 of the pellet outlet chute 90 may, at least partially, wrap around the ring 68 and stop ring 100, which extend from the exterior of the drum 60. In this manner, the ring 68, stop ring 100, and ridges 92 may overlap one another to prevent pellets from escaping from the sides of the pellet outlet chute 90. In some embodiments, multiple rings 68 may be used to decrease the spacing between each ring 68, 100, thereby decreasing the likelihood of pellets undesirably escaping the pellet outlet chute 90. Further, as shown in FIGS. 7-9, an outlet chute cover 101 may be provided to cover the upper sections of ring 68 and stop ring 100 to prevent splashing of pellets out of the outlet region.

During operation of the crystallizer tumbler 10, the drum 60 may be configured to rotate along its longitudinal axis in a clockwise and/or counter-clockwise direction. The motor 140 may rotate the driveshaft 154 and its rollers 152, which in turn cause the drum wheels 66 to rotate. In some embodiments, the drum 60 may be configured to rotate in a single direction (e.g., clockwise or counter-clockwise). In other embodiments the drum 60 may be configured to rotate in multiple directions, either randomly or in accordance with a predetermined pattern. Additionally, in other embodiments, the rotation speed of the drum 60 may vary based on a number of factors (e.g., the direction of rotation, air/gas flow rate within the tube 70, the material of the pellets, the speed of crystallization, the desired residence time, the desired pellet flow rate) or be fixed. For example, the rotation speed of the drum 60 may be fixed based on preset settings of the motor 140, or a variable frequency drive may allow infinitely variable adjustments in the drum rotation speed.

It is contemplated that one or more indicators or controllers (not shown), which may be computerized controllers having one or more processors, may automatically control operation of one or more components within the tumbler 10. For example, as shown in FIGS. 6-8, one or more sensors 165 may measure the temperature level of pellets entering and/or exiting the pellet inlet and outlet and communicate the measured temperature level to the indicator/controller. To this end, a thermocouple 175 has its tip immersed in the incoming flow of pellets to measure the temperature of the incoming pellets, and another has its tip immersed in the pellets at the pellet outlet to determine the temperature of the pellets as they exit drum 60. When the controller determines that the incoming pellet temperature level differs from a predetermined threshold, that the exiting pellet temperature level differs from a predetermined threshold, or that the temperature difference level between incoming and exiting pellets differs from a predetermined threshold, it may direct one of the components of the tumbler 10 to perform differently. In one embodiment, the controller may direct the tilt mechanism 80 to change the angle of the drum 60, thereby increasing or decreasing the residence time of the pellets. In another embodiment, the controller may direct the motor 140 to change the rotation speed or rotational direction of the drum 60. In this regard, speed of rotation sensors (not shown) may be employed to measure the drum RPMs. These may be optical, electrical, or mechanical sensors, as is known in the art, and may be configured to send a speed signal to the controller and may give a visual signal as to the RPM of the drum. This speed may be increased or decreased, automatically or manually, depending on the need for agitation of the materials to be crystallized. In another embodiment, the controller may direct the blower(s) to provide heated air/gas through the air tube 73 to increase or decrease the air/gas flow rate, thereby increasing or decreasing pellet temperature. In a preferred embodiment, it is contemplated that sensors 165 with attached thermocouples 175 are attached to adjustable support arms 185, with adjustable support arms in turn attached to air tube 73. Adjustable support arms 185 may have an adjustment slot 186 that allows the arm to pivot about its attachment point 187 into its desired position, and then be fixed at the desired position by tightening a fastener (not shown) in the adjustment slot 186. In this way, thermocouple 175 may be adjusted further into or out of the tumbling bed of pellets depending on the depth of the bed and the position of the bulk of the bed as it moves with the tumbling action of the drum. Arms 185 may be fabricated to a length that positions the thermocouple, located near the end of arm 185, near the inlet and outlet of pellets within the drum 60, or at any desired position within the pellet bed, as may be determined.

A further thermocouple which is not immersed in the material bed, not shown, may be provided to measure the internal air temperature within drum 60. As an alternative to the immersed thermocouples 175, other types of non-contact sensors may be used, such as infrared temperature sensors, thereby avoiding contact with the tacky pellets and potential sticking to the thermocouples and formation of agglomerates.

The controller may also automatically control the opening and closing of the doors 30 based on an operation mode of the tumbler 10. For example, the controller may direct the doors 30 to close when the motor 140 begins to rotate the drum 60. The controller may direct the doors to open, for example, when the motor 140 is not rotating the drum 60.

The controller may be in communication with other sensors to improve operation of the tumbler 10. For example, in some embodiments, one or more flow sensors may measure the pellet inlet flow and/or outlet flow entering or exiting the tumbler 10. The controller may control features of the tumbler 10 to achieve a more consistent pellet flow exiting the tumbler 10. Further, the controller may detect blockages within the tumbler 10 disrupting pellet flow and shut down operation of one or more of the features of the tumbler 10. In other embodiments, the controller may send an alert to an operator (e.g., to a display in communication with the controller or to an operator's mobile phone, computer, or other device via a wireless or wired communication) upon detecting a blockage within the tumbler 10. In other embodiments, the flow sensors may measure the amount of pellets exiting the tumbler 10, which the controller may then provide to the operator (e.g., via the display). In further embodiments, the controller may be in communication with flow sensors at the pellet inlet chute 40 and the pellet outlet conduit 130, and may be configured to compare the measured flow of pellets at each point. When the difference between the measured flow of pellets at the inlet and outlet exceeds a predetermined threshold, the controller may shut down operation of the tumbler 10 or alert the operator to a clog or leak. In this manner, the controller may help the operator identify and remove clogs of pellets while they are small, thereby minimizing wasted product and lost machine time.

In other embodiments, the controller may be in communication with one or more static electricity sensors configured to measure the level of static electricity built up at certain points on the tumbler 10. In this manner, the controller may determine whether the static dissipation brush 29 or other static dissipation device is sufficient to dissipate the static electricity accrued by the tumbler 10, and serve as a safety mechanism to prevent the operator from undesired shocks. When the controller receives a signal from these sensors that the level of static electricity exceeds a predetermined threshold, the controller may respond by shutting down operation of the tumbler 10 and/or alerting the operator.

It is contemplated that, in conjunction with various sensors, the controller may configure the tumbler 10 for one or more modes of operation. In some embodiments, the controller may store the modes of operation on memory, and allow the operator to select a desired mode of operation via the display or another device in communication with the controller. The modes of operation may be directed to different pellet materials, sizes, or shapes, and flow rate. For example, tacky pellets may be handled with higher rotation rates than tacky and brittle materials.

Of course, it is contemplated that, in place of an automated controller, an operator may perform the same functions by reading the various signals from a digital or analog display and vary the conditions of the crystallizer tumbler accordingly.

In an exemplary method of operation, crystallizer tumbler 10 may be operated to crystallize a polymer in the following manner. A crystallizable material is first pelletized using an underwater pelletizer system such as one manufactured by Gala Industries and described in U.S. Pat. No. 9,032,641. In this pelletizer system, pellets quickly are transferred from a cutting chamber to a centrifugal dryer by means of a water system and an air injection system within the water system. This air injection system, developed by Gala Industries and termed CPT® Process, causes the pellets to reach the dryer in a very short time so that the pellets retain the majority of the internal heat imparted to them through the extrusion process. In this way, the pellets exit the dryer and are transferred to the crystallizer tumbler with enough remaining internal heat to cause crystallization of the pellets, and the insulated nature of the tumbler drum will help prevent the loss of this retained heat throughout the residence time of the pellets. For materials for which use of the crystallizer tumbler is indicated, the pelleted material will remain in a tacky state until a certain desired level of crystallinity is achieved. In order to prevent agglomeration while the crystallization process takes place, the crystallizer tumbler will gently tumble the material and retain the material within the drum for a residence time needed to complete sufficient crystallization until the pellets are no longer tacky. This residence time is controlled by the inclination of the tumbler drum, the tumbler drum rotation speed, agitator design and quantity, location, number and design of the baffle plates, and the design and adjustment of the damper plates. Incoming pellet temperature and outgoing pellet temperature are monitored using the immersed thermocouples and other temperature sensors, to assure maintenance of sufficient heat to achieve crystallization. The gentle tumbling action of the pellets provided with the crystallizer tumbler of the present invention provides an improvement in preventing agglomeration over vibrating conveyor type crystallizers, provides an improvement in preventing fines generation and pellet fracture over torus disc type crystallizers, while not requiring any additional input of energy to heat the pellets. Further, the tumbler type crystallizer may have a lower power consumption to maintain the motion of the pellets than other crystallizing devices. In this manner, as explained in the various embodiments described herein, the tumbler crystallizer 10 provides an improvement over vibrating conveyor, torus disc, or stirring paddle type crystallizers for tacky materials.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A crystallizer tumbler device, comprising:
   a housing comprising:
   a rotatable drum comprising panels, a tumbling bed, a first thermocouple, the first thermocouple placed at an inlet of the rotatable drum to measure a first temperature of pellets flowing into the rotatable drum;
   a tilting device configured to adjust an angle of the housing relative to a horizontal plane;
   one or more connectors attached to one end of the housing and configured to rotate relative to one or more pivot points when the tilting device tilts the rotatable drum;
   one or more agitators configured to agitate pellets and prevent agglomerations within the rotatable drum as the drum rotates; and
   one or more damper plates arranged near an outlet of the rotatable drum configured to provide a partial impediment to a flow of pellets out of the rotatable drum, wherein at least one damper plate of the one or more damper plates is configured to adjust to create an opening between two adjacent damper plates of the one or more damper plates for the flow of pellets to flow.

2. The tumbler device of claim 1, wherein the panels comprise at least one transparent material selected from the group consisting of polycarbonate, glass, acrylic, ceramic, and combinations thereof.

3. The tumbler device of claim 1, wherein the panels are insulative panels configured to prevent heat loss from within the rotating drum.

4. The tumbler device of claim 1, further comprising a conduit connecting a pellet inlet chute to the rotatable drum, wherein the conduit is configured to house a powder feeder, the power feeder is configured to introduce a material for coating pellets to reduce agglomeration.

5. The tumbler device of claim 1, further comprising a second thermocouple, the second thermocouple placed at the outlet of the rotatable drum configured to measure a second temperature of pellets flowing out of the rotatable drum.

6. The tumbler device of claim 5, further comprising a controller coupled to the first thermocouple, the second thermocouple, and the tilting device, the controller comprising one or more processors configured to direct the tilting device to adjust the angle of the housing relative to a horizontal plane in response to determining that the first temperature exceeding a first threshold, the second temperature exceeding a second threshold, a temperature difference level between the first temperature and the second temperature exceeding a temperature difference threshold, or a combination thereof.

7. The tumbler device of claim 6, wherein a third thermocouple is placed inside the rotatable drum and is configured to monitor a third temperature of an air within the rotating drum, and wherein the controller is coupled to the third thermocouple and the one or more processors of the controller are further configured to direct the tilting device to adjust the angle of the housing relative to a horizontal plane in response to the third temperature exceeding a third threshold.

8. The tumbler device of claim 1, wherein the one or more agitators has a trapezoidal cross-section or L-shaped cross section.

9. The tumbler device of claim 1, wherein the tilting device is configured to lift up to five degrees or let down up to five degrees one end of the rotatable drum.

10. The tumbler device of claim 1, further comprising:
   an air tube partially disposed within the rotatable drum, the air tube configured to direct a heated gas received from a blower section to the rotatable drum through one or more apertures.

11. The tumbler device of claim 1, further comprising a vertically mounted deflector plate near the drum inlet and configured to prevent pellets flowing into the rotatable drum from prematurely bouncing and/or splashing towards the outlet of the rotatable drum.

12. The tumbler device of claim 6, further comprising a motor rotatably coupled to the rotatable drum, wherein the one or more processors of the controller are further configured to change the rotation speed or rotational direction of the rotatable drum.

13. The tumbler device of claim 5, wherein the first and second thermocouples are attached to adjustable support arms that allows the first and second thermocouples to be adjusted into or out of the tumbling bed of pellets.

14. The tumbler device of claim 1, wherein baffle plates are placed circumferentially around the interior of the drum, and spaced longitudinally along the drum, the baffle plates configured to slow the flow of pellets from the inlet to the outlet of the drum.

15. The tumbler device of claim 14, wherein the baffle plates are arranged at an angle to the flow of pellets such that the angled baffle plates push back the pellets impeding their flow towards the outlet of the rotating drum.

16. A method of crystallizing pellets in a crystallizer, the method comprising:
providing pellets into a drum of the crystallizer;
measuring, via a first thermocouple, a first temperature of the pellets after entering the drum;
rotating the drum containing the pellets;
tilting the drum to a predetermined angle to change a flow of the pellets within the drum based on the first temperature differing from a first predetermined temperature threshold;
providing one or more adjustable damper plates arranged near an outlet of the rotatable drum configured to provide a partial impediment to a flow of pellets out of the rotatable drum;
adjusting at least one damper plate of the one or more damper plate to create a desired opening between two adjacent damper plates to control the flow of pellets; and
directing the flow of pellets out the outlet of the drum.

17. The method of claim 16, further comprising measuring a second temperature of the pellets before exiting the drum, wherein tilting the drum is based on whether the first temperature differs from the first predetermined temperature threshold, whether the second temperature differs from a second predetermined temperature threshold, whether a temperature difference between the first temperature and the second temperature differs from a predetermined temperature difference threshold, or a combination thereof.

18. The method of claim 17, further comprising:
directing a flow of heated air from an air tube at least partially disposed within the drum through the drum; and
changing a flow rate and/or temperature of the air based on the second temperature.

19. A method of crystallizing pellets in a crystallizer having a rotating drum, the method comprising:
providing pellets into the rotating drum of the crystallizer;
measuring, via a first thermocouple, a first temperature of the pellets entering the drum;
rotating the drum containing the pellets;
initiating a flow of heated air from an air tube at least partially disposed within the drum through the drum based on the first measured pellet temperature being below a temperature necessary to achieve crystallization;
providing one or more adjustable damper plates arranged near an outlet of the rotating drum configured to provide a partial impediment to a flow of pellets out of the rotating drum, at least one damper plate of the one or more damper plates is configured to adjust to create an adjustable opening between two adjacent damper plates of the one or more damper plates for the flow of pellets to flow; and
directing the flow of pellets to exit through the outlet of the drum.

20. The method of claim 19, further comprising:
measuring, via a second thermocouple, a second temperature of the pellets exiting the drum;
changing a flow rate and/or temperature of the heated air based on the second temperature.

* * * * *